United States Patent

Hummer

[15] 3,697,088
[45] Oct. 10, 1972

[54] FLOATING BUSHING

[72] Inventor: Herbert B. Hummer, Kalamazoo, Mich.

[73] Assignee: Durametallic Corporation, Kalamazoo, Mich.

[22] Filed: Aug. 28, 1970

[21] Appl. No.: 67,846

[52] U.S. Cl. .......................277/9, 277/65, 277/74
[51] Int. Cl. ..................................F16j 15/38
[58] Field of Search..........277/9, 58, 65, 74, 75, 173, 277/174, 175, 188, 189; 267/1.5; 287/52.06

[56] References Cited

UNITED STATES PATENTS

| 2,835,514 | 5/1958 | McGahan | 277/74 X |
| 3,071,398 | 1/1963 | Henning | 287/52.06 |
| 2,560,917 | 7/1951 | Bebinger | 277/188 X |
| 3,096,985 | 7/1963 | Biheller | 277/9 |
| 3,333,855 | 8/1967 | Andresen | 277/175 X |
| 3,462,159 | 8/1969 | Baumann et al. | 277/74 X |
| 3,467,396 | 9/1969 | Hershey | 277/65 X |

*Primary Examiner*—William F. O'Dea
*Assistant Examiner*—P. D. Ferguson
*Attorney*—Woodhams, Blanchard and Flynn

[57] ABSTRACT

A mechanical seal construction for use between a wall and a shaft extending therethrough and rotatable relative to the wall. The seal construction includes a conventional mechanical seal assembly having a pair of seal members with mutually contacting seal faces thereon, one seal member being fixed with respect to the wall and the other seal member being capable of rotation with the shaft. A floatable bushing assembly is disposed adjacent the mechanical seal assembly and includes an annular bushing member surrounding the shaft and floatable relative to a surrounding stationary housing member. The bushing member is resiliently urged against the housing member to sealingly engage same. A small radial clearance is provided between the bushing member and the shaft to permit relative rotation therebetween whereas the bushing is free to radially float in response to deflection or whip of the shaft. The floating bushing assembly is disposed outwardly from the mechanical seal assembly to act as a safety or back-up for preventing large quantities of fluid from suddenly escaping in the event of a failure of the mechanical seal assembly.

6 Claims, 3 Drawing Figures

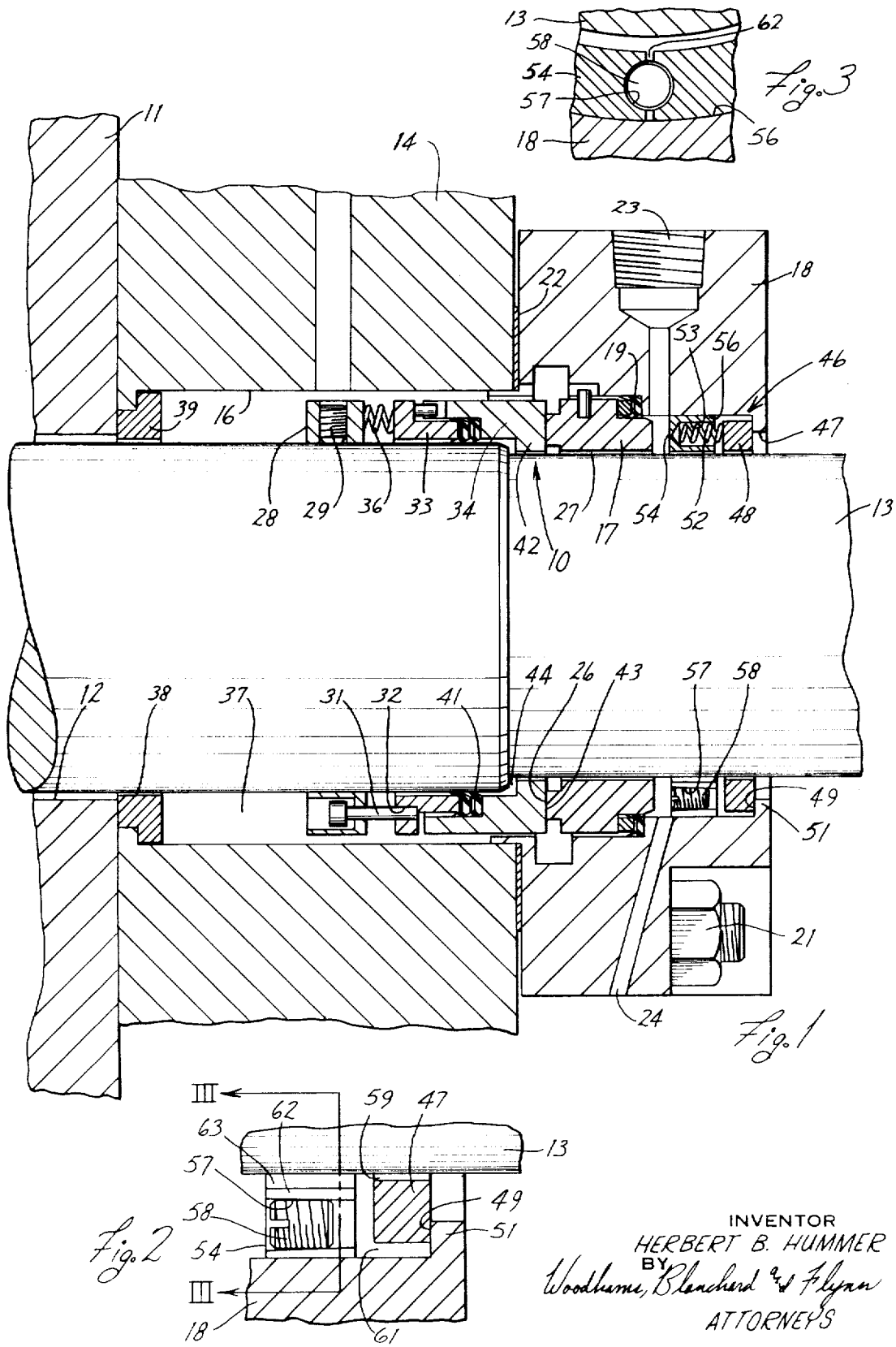
INVENTOR
HERBERT B. HUMMER

FLOATING BUSHING

FIELD OF THE INVENTION

This invention relates to an improved mechanical seal construction and, in particular, relates to a mechanical seal construction having a floatable bushing assembly mounted adjacent and coacting with a conventional mechanical seal assembly, the floatable bushing assembly being usable as a safety device for preventing the sudden escape of large quantities of fluid in the event of a failure of the mechanical seal assembly.

BACKGROUND OF THE INVENTION

While the apparatus of the invention is applicable to a wide range of devices wherein a rotatable shaft extends through a wall, said wall usually being a portion of a closed vessel in which a fluid pressure is created, it is particularly applicable to such devices as pumps or autoclaves. Accordingly, for the purposes of discussion, reference will be made hereinafter to the use of such invention with pumps. Such specific reference will, however, be clearly understood as being illustrative only and imparting no limitation in the use or applicability of the invention.

Mechanical seals for rotating shafts, such as in or adjacent the stuffing box of a centrifugal pump, normally are grouped into either of two well known classes, which classes are commonly termed "inside seals" or "outside seals" depending on whether the sealing faces thereof are inside or outside of the stuffing box of the equipment being sealed. The use of inside seals in many situations is preferred since, for reasons well understood by those skilled in the art, they are more satisfactory from such standpoints as lubrication, capacity to withstand high pressures and temperature control.

While inside seals are highly developed such that they now perform in an efficient and satisfactory manner for extended periods of time, nevertheless occasional seal failures are inevitable, such that when a seal failure does occur a substantial flow or sudden flood of the pumping fluid often occurs, resulting in a totally undesirable operational and environmental situation.

Failure of a mechanical seal assembly is particularly undesirable and dangerous when the pump or other equipment is being used in association with a hazardous or dangerous fluid or slurry, such as a radioactive fluid. Permitting large quantities of a radioactive fluid to suddenly escape obviously subjects the operating personnel to serious and undesirable health hazards. While numerous attempts have been made to provide safety devices for preventing the loss of hazardous fluids, such as radioactive fluids, in the event of a seal failure, all of the prior known devices, to the best of my knowledge, either have failed to satisfactorily prevent leakage of substantial quantities of the dangerous fluid, have been exorbitantly costly, have occupied substantial space, or have been unduly mechanically complex. These factors have thus made use of the prior known safety devices at least partially unsatisfactory.

Accordingly, it is an object of the present invention to provide a seal construction having a safety device associated therewith for overcoming the above disadvantages. Particularly, it is an object of the present invention:

1. To provide an improved seal construction having a conventional mechanical seal and an improved floating bushing assembly disposed in series with the mechanical seal assembly for controlling, or at least inhibiting, leakage in the event of a failure of the mechanical seal assembly.

2. To provide a seal construction, as aforesaid, wherein the mechanical seal assembly is disposed within a stuffing box and the floating bushing assembly is disposed outside the mechanical seal within a stationary gland for restricting or throttling any leakage therepast in the event of a failure of the mechanical seal assembly.

3. To provide a seal construction, as aforesaid, having a stationary annular bushing floatingly mounted in surrounding relationship to a rotatable shaft for enabling the bushing to follow the shaft movement so as to compensate for shaft run out or misalignment, thus eliminating excessive wear on the shaft or bushing, while at the same time permitting the radial clearance between the shaft and the bushing to be held to a minimum so as to restrict the flow through the clearance in the event of a failure of the mechanical seal assembly.

4. To provide a seal construction, as aforesaid, having an improved floating bushing assembly connected in series with a mechanical seal assembly for providing a back-up to the mechanical seal assembly, with the floating bushing assembly being economical to manufacture and maintain, and occupying only a minimum amount of space.

Other objects and purposes of the present invention will be apparent to persons acquainted with devices of this type upon reading the following specification and inspecting the accompanying drawings.

BRIEF DESCRIPTION OF THE DRAWINGS

FIG. 1 is a central sectional view of a mechanical seal construction embodying the present invention.

FIG. 2 is an enlarged fragmentary view of a portion of FIG. 1.

FIG. 3 is a fragmentary sectional view taken along the line III—III of FIG. 2.

Certain terminology will be used in the following description for convenience in reference only and will not be limiting. The words "upwardly", "downwardly", "leftwardly" and "rightwardly" will designate directions in the drawings to which reference is made. The words "inwardly" and "outwardly" will refer to directions toward and away from, respectively, the geometric center of the device and designated parts thereof. Said terminology will include the words above specifically mentioned, derivatives thereof and words of similar import.

SUMMARY OF THE INVENTION

In general, the objects and purposes of the invention are met by providing a mechanical seal construction for use between a wall and a rotatable shaft extending therethrough, and wherein the mechanical seal construction has an inside mechanical seal assembly, which may be conventional, disposed within a stuffing box and having a pair of relatively rotatable seal members having mutually contacting sealing faces. A floatable bushing assembly is disposed outwardly from the mechanical seal assembly to provide a safety device for preventing excessive losses of the pressure fluid in the event of a failure of the mechanical seal assembly. The floating bushing assembly is positioned within an annular gland member which is fixedly secured to the stuffing box. The bushing assembly includes an annular bushing member surrounding the shaft and resiliently urged into engagement with an annular face formed on the gland, whereby the annular bushing member is nonrotatably held relative to the gland. The annular bushing is, however, freely mounted for radial floating movement relative to the shaft and relative to the gland so as to remain centered relative to the shaft, whereupon the annular bushing will thus freely radially float so as to follow the shaft irrespective of shaft run out, misalignment or deflection. The floating movement of the bushing substantially eliminates excessive wear on either the bushing or shaft. Further, due to the radial floating movement of the bushing, the radial clearance between the bushing and the shaft can be held to an absolute minimum, the clearance being just sufficient to permit free rotation of the shaft within the bushing. An annular collar is fixedly clamped to the gland and supports thereon springs which resiliently urge the annular bushing into frictional sealing engagement with the gland. While a limited leakage may occur through the radial clearance between the bushing and the shaft in the event of a failure of the mechanical seal assembly, nevertheless such leakage is sufficiently restricted, due to the small radial extent of the clearance, that only a minimum leakage will occur prior to the equipment being shut down.

DETAILED DESCRIPTION

Referring to the drawings, there is shown a wall 11 having an opening or recess 12 through which extends a rotatable shaft 13. The wall 11 may comprise a wall of a centrifugal pump, autoclave, turbine or generally similar apparatus, but for purposes of illustration will be considered to be a wall of a pump, with the rotatable shaft 13 extending through the wall for supporting thereon the pump impeller.

For sealing the extending shaft 13 relative to the wall 11, there is provided a housing 14 for enclosing and surrounding a conventional mechanical seal assembly 10. The housing 14 may be connected to the wall 11 by conventional means, such as bolts (not shown). The housing 14 has an annular recess or bore 16 therethrough, commonly referred to as the "stuffing box", in which is disposed the mechanical seal assembly 10.

The mechanical seal assembly 10 comprises in this embodiment a stationary annular seal member 17 which surrounds the shaft 13. In the illustrated embodiment of the invention, the annular seal member 17 is a gland insert which is mounted in a gland 18. The gland 18 is secured to the housing 14 by conventional means, such as bolts or screws 21. Suitable sealing means, such as the resilient seal ring 19 and the gasket 22, are provided between the gland insert 17 and the gland 18 and between the gland 18 and the housing 14.

The gland 18 has an opening 23 therethrough for supplying coolant to the gland insert 17. A further opening 24 is provided in the gland 18, in a conventional fashion, to permit the cooling fluid to exit therefrom. The gland insert or annular stationary seal ring 17 is also radially spaced from the shaft 13 to define an annular clearance 27 therebetween, which clearance 27 receives therein coolant from the inlet opening 23. The inner end of the gland insert 17 also has an accurately finished radial seal surface or face 26 thereon. The gland insert 17 can be made of any suitable material, such as carbon.

The mechanical seal assembly 10 also includes in this embodiment a collar 28 which encircles and is fixedly secured to the shaft 13 by suitable means, such as one or more set screws 29. The collar 28 has a plurality of drive pins 31, of which one appears in FIG. 1, extending into suitable openings 32 in annular compression ring 33. The annular compression ring 33 is urged against an annular rotating seal member 34, in part mechanically by any convenient and known means, which are indicated as being a plurality of springs 36 which are compressed between the collar 28 and the annular compression ring 33, and in part by pressure fluid entering the chamber 37 from the pump through a clearance 38 as defined between the shaft 13 and a conventional stationary throat bushing 39. Conventional shaft packing 41 is disposed between the annular ring 33 and the rotating seal member 34.

The rotating seal member 34 has an annular axial projection 42 which is provided with an accurately finished radial seal face 43 on one end thereof. The rotating seal member 34 is urged against the nonrotating seal member or gland insert 17 so that the sealing face 43 is urged against the seal face 26 to form a seal therebetween. An annular clearance 44 is provided between the rotating seal member 34 and the shaft 13 in a well known manner to provide a slightly floating relationship between the rotating seal member 34 and the shaft 13 for the purpose of maintaining alignment between the two seal members 17 and 34. The clearances 27 and 44 define a chamber into which the coolant is introduced by the inlet 23.

It will be recognized by those skilled in the art that all of the foregoing described mechanical seal structure is conventional and may be varied widely within the scope of the invention. It is set forth here in some detail solely for background purposes and to ensure a complete understanding of the following described portion thereof wherein the substance of the invention is embodied.

A floating bushing assembly 46 is provided outwardly from the mechanical seal assembly 10 for throttling or restricting fluid leakage in the event of a failure of the mechanical seal assembly 10. The floating bushing assembly 46 is specifically designed for substantially closing or restricting the outlet opening 47 as provided in the gland 18. The bushing assembly 46 includes an annular floatable bushing 48 disposed in surrounding relationship to the shaft 13 and maintained in snug sealing engagement with the inner annular surface 49 as formed on the annular projection 51. Resilient means, such as a plurality of circumferentially spaced springs 52, resiliently urges the bushing 48 into engagement with the surface 49. The inner ends of the springs 52 are positioned within pockets 53 formed within a clamping collar 54 but preferably have only a surface bearing against the bushing so that if the shaft whip causes the shaft to contact the bushing, the bushing can rotate in a limited manner with the shaft.

The clamping collar 54 and the floatable bushing 48 are both disposed within an enlarged annular bore 56 formed within the gland 18, the collar 54 being radially expandable outwardly into clamping engagement with the peripheral wall defining the bore 56 by means of a threaded tapered screw 58 received within a threaded opening 57 as formed in the expandable collar 54. The collar 54 is generally provided with a radial slit 62 extending at least part way through the radial thickness thereof for enabling the collar to radially expand in response to rotation of the tapered screw 58. The inner peripheral wall of the collar 54 is spaced a substantial radial distance from the shaft 13 so as to define an annular clearance 63 therebetween, thereby preventing contact between the shaft and the collar.

As illustrated in FIG. 2, an annular clearance 59 is provided between the shaft 13 and the floatable bushing 48 for permitting the shaft 13 to freely rotate relative to the bushing 48, the bushing 48 being normally nonrotatable, excepting as noted above, due to its frictional engagement with the stationary gland 18. The radial clearance 59 provided between the shaft 13 and the bushing 48 may be as small as 0.002 inch, and is generally within the range of between approximately 0.002 inch and approximately 0.004 inch. The small radial clearance is sufficient to permit the shaft 13 to freely rotate while at the same time it permits only a restricted or small leakage therethrough in the event of failure of the main mechanical seal assembly 10.

The bushing 48 is preferably constructed from a suitable seal material, such as carbon, so as to permit a suitable sealing engagement to occur between the bushing 48 and the surface 49.

A further annular clearance 61 is provided between the bore 56 and the outer diameter of the bushing 48 so as to permit the bushing 48 to freely float radially relative to the shaft 13 and relative to the gland 18 so as to compensate for shaft deflections or whip. The radial clearance 61 is preferably substantially larger than the radial clearance 59.

OPERATION

Although the operation of the seal construction embodying the invention has been indicated somewhat above, said operation will be described in detail hereinbelow to assure a more complete understanding thereof.

During operation, the fluid being pumped will flow through the clearance 38 into the stuffing box chamber 37, whereupon the fluid will, as is conventional, then assist the springs 36 in urging the rotating seal face 43 into tight sealing engagement with the seal face 26. The pump fluid will be prevented from escaping from the chamber 37 due to the sliding sealing engagement between the seal faces 26 and 43, and additionally due to the provision of the gasket 22 and the elastomeric seal rings 19 and 41.

To maintain the seal faces 26 and 43 relatively cool, a cooling fluid will be supplied through the inlet opening 23 into the compartment defined by the bore 56, whereupon the cooling fluid will then enter the clearances 27 and 44 so as to come into contact with the seal faces 26 and 43 adjacent the inner edges thereof. The cooling fluid will exit from the compartment defined by the bore 56 by means of the exit opening 24. Since the cooling fluid as supplied to the bore 56 will normally be slightly pressurized, the cooling fluid will thus assist the springs 52 in urging the floating bushing 48 into tight sealing engagement with the surface 49. However, inasmuch as a small radial clearance 59 always exists between the bushing 48 and the shaft 13, at least a limited amount of the cooling fluid may escape through the clearance 59. However, the amount of cooling fluid which may escape through the clearance 59 is normally insignificant inasmuch as the pressure of the cooling fluid is maintained at a minimum. Further, the cooling fluid often comprises water, steam or a similar nonharmful liquid which, if it does escape through the clearance 59, will cause no serious inconvenience or damage. The non-rotation, or at least substantial non-rotation, of the bushing with respect to the housing 18 minimizes wear thereof such that the bushings will last practically indefinitely.

If a failure of the primary mechanical seal assembly 10 should occur, such that the pump fluid as contained within the chamber 37 would then pass into the compartment defined by the bore 56, a sudden leakage of large quantities of pump fluid will be prevented due to the presence of the floating bushing assembly 46, which bushing assembly acts as a secondary or safety seal assembly for backing up the primary mechanical seal assembly 10.

Particularly, when a failure of the primary seal assembly 10 occurs, the pump fluid which passes into the bore 56 will be materially inhibited from escaping through the opening 47 due to the provision of the floatable bushing 48, which bushing is now maintained by the pressure of the fluid itself in sealing engagement with the surface 49. While limited leakage of the pump fluid may occur through the radial clearance 59, the clearance 59 is maintained at an absolute minimum by permitting the bushing 48 to float radially relative to the shaft so as to compensate for shaft deflection or whip. With such radial clearance so minimized, such as in the neighborhood of 0.002 inch, only limited quantities of the pump fluid can at worst flow through the clearance 59.

The provision of the floatable bushing assembly 46 thus prevents large quantities of the pump fluid from suddenly escaping in the event that the primary mechanical seal assembly 10 fails. While the bushing assembly 46 may permit a small amount of leakage to occur, nevertheless this small amount of leakage can be tolerated, at least until the overall assembly is shut down so as to permit repair or replacement of the main seal assembly 10.

The provision of the floatable bushing assembly 46 is especially critical in installations wherein the pump is pumping a radioactive material since large quantities of radioactive material can obviously not be permitted to escape in the event that the mechanical seal assembly 10 should fail.

Although a particular preferred embodiment of the invention has been disclosed in detail above for illustrative purposes, it will be recognized that variations or modifications of the disclosed apparatus, including the rearrangement of parts, lie within the scope of the present invention.

The embodiments of the invention in which I claim an exclusive property or privilege are defined as follows:

1. In a mechanical seal construction for use between a wall having an opening therethrough and a shaft extending through said opening and rotatable relative to said wall, said seal construction including:
   housing means affixable to said wall and encircling said shaft, said housing means having a bore therethrough so as to define an annular chamber substantially concentric with and surrounding said shaft, said bore communicating with said opening;
   mechanical seal means disposed within said chamber in sealing engagement with said shaft and said housing means, said mechanical seal means dividing said chamber into first and second separated compartments, said first compartment being positioned between said seal means and said wall and communicating with said opening for permitting a pressure liquid to be received therein, said second compartment being disposed on the other side of said seal means from said first compartment;
   said mechanical seal means including first and second annular seal members having annular seal faces disposed in sliding sealing engagement with one another for preventing flow of pressure fluid from said first compartment to said second compartment, said first and second seal members surrounding and being radially spaced from said shaft;
   first mounting means nonrotatably connecting said first seal member to said housing means; and
   second mounting means nonrotatably connecting said second seal member to said shaft while permitting at least limited radial floating movement of said second seal member relative to said shaft for maintaining alignment between said first and second seal members irrespective of deflection of said shaft; the improvement comprising
   floating bushing means disposed within said second compartment for restricting the escape of pressure fluid from said second compartment to the surrounding environment in the event of flow of pressure fluid from said first compartment to said second compartment due to a failure of said mechanical seal means, said floating bushing means including an annular bushing member encircling said shaft and arranged for free radial floating movement relative to said housing means for enabling said bushing to radially follow said shaft, the internal periphery of said bushing member being spaced from the external periphery of said shaft by a radial clearance of at least approximately 0.002 inch whereby said bushing member is normally spaced from said shaft and nonrotatable relative to said housing means, said housing means including an end wall extending radially toward said shaft for holding said bushing member within said second chamber, and resilient means for urging said bushing member into sealing engagement with said end wall.

2. A seal construction according to claim 1, including an annular collar disposed in surrounding relationship to and spaced from said shaft, said collar being fixedly secured to said housing means and having a plurality of recesses formed therein, and said resilient means including a plurality of springs coacting between said collar and said annular bushing member for resiliently urging said annular bushing member into bearing engagement with said end wall to create a seal therebetween and to non-rotatably hold said bushing member in position, each of said springs being disposed within one of the recesses formed in said collar.

3. A mechanical seal construction according to claim 2, wherein said collar has a radial slit extending therethrough and a threaded opening in the region of said slit, and a tapered threaded screw adapted to engage with said threaded opening for causing radial expansion of said collar into clamping engagement with said housing means.

4. A mechanical seal construction according to claim 1, wherein a radial clearance of between approximately 0.002 and 0.004 inch is provided between the external periphery of said shaft and the internal periphery of said floating bushing member.

5. A mechanical seal construction according to claim 4, further including means for supplying a cooling fluid into said second compartment between said mechanical seal means and said bushing means for at least partially cooling said mechanical seal means and assisting in holding said bushing member in an operative position, and means permitting entry of pumped fluid under pressure into said first compartment.

6. The device defined in claim 4, wherein said bushing member is solely frictionally related to both said resilient means and to said end wall so that, while rotation of said bushing member is possible in response to rotation of said shaft, said bushing member is normally not rotatable with respect to said housing means.

* * * * *